May 2, 1967  A. GREFFE  3,317,308
PROCESS FOR REDUCTION OF IRON ORES
Filed Oct. 11, 1963

INVENTOR.
André Greffe
BY Webb, Mackey & Burden
HIS ATTORNEYS

3,317,308
PROCESS FOR REDUCTION OF IRON ORES

Andre Greffe, Annecy, France, assignor to Societe d'Electro-Chimie, d'Electro-Metallurgie et des Acieries Electriques d'Ugine, Paris, France, a corporation of France
Filed Oct. 11, 1963, Ser. No. 315,636
Claims priority, application France, Oct. 16, 1962, 912,419
8 Claims. (Cl. 75—33)

The present invention relates to the reduction of iron ores in the solid state in a rotary furnace to obtain a mixture containing, on the one hand, a non-metallic product resulting from the treatment of the mixture and, on the other hand, grains of solid metal with a very low carbon content. This low carbon product and the non-metallic product can be directly melted to obtain a very low carbon steel bath, or can be crushed and separated mechanically or magnetically.

Numerous processes for the treatment of iron ores in rotary furnaces have been described. Generally, the amount of carbonaceous reducing agent utilized is such that the obtained metal contains a notable amount of carbon. Some of these processes have not been applied industrially because of their low yield of recovered iron. Other processes are also known in which one operates with an eventual addition of fluxing agent at a sufficient temperature so that the treated product may in the reduction zone have the form of a paste inside which the reduced iron grains collect into lumps which afterwards are easy to separate. Lastly, other processes do not assure a continuous working of the plant due to involuntary excessive softening of the gangue and to the adhesion of the product under treatment to and along the refractory walls of the furnace.

By "adhesion" is meant the partial melting of the mixture components which provokes coating of the carbon grains and their separating from the grains to be reduced. Such adhesions effect a lower yield of the iron from the ores and the formation of pasty products which stick to the furnace walls and gather into agglutinates which disturb the operation of the furnace.

Industrially, it is preferable to work at high temperature because the reduction speed is then higher. Thereby, it is possible to utilize less costly equipment for a determined yield or to obtain a higher yield with given equipment. But, when reaching a certain temperature, and then higher temperatures, the products to be reduced begin to melt and the adhesion phenomenon appears.

Figure 1:
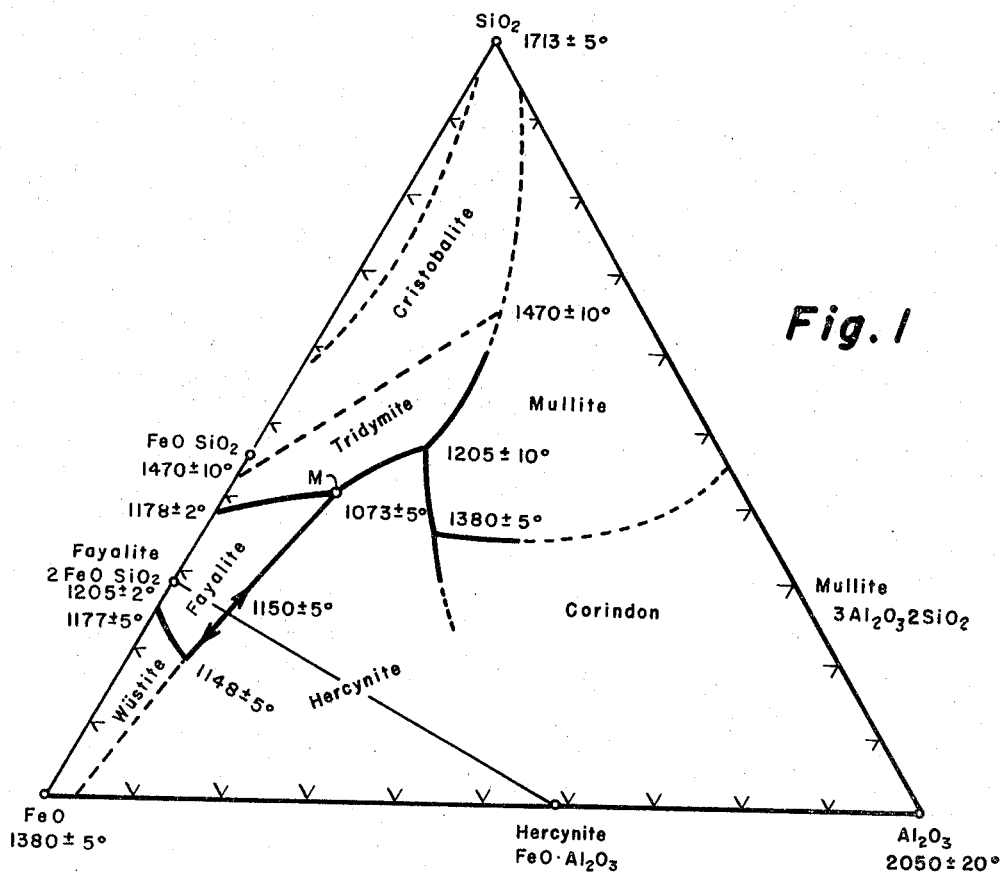
Figure 2:
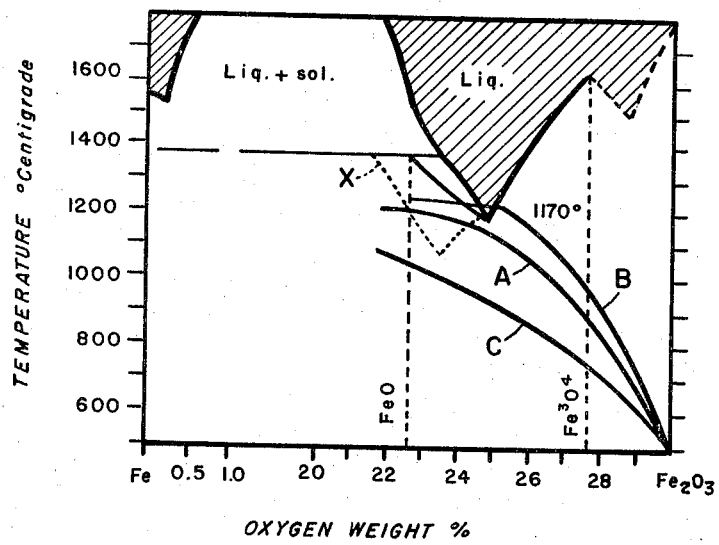

FIGURE 1 is a phase diagram of the silicious ores with which this invention is concerned; and FIGURE 2 is a graph showing the relationship between temperature and oxygen content of the ore with which this invention is concerned.

Effectively, during the reduction the melting temperature of the iron oxides, away from silica, reaches a minimum near 1170° C. for an oxidation state corresponding approximately to FeO. But, in the presence of silica, fusible silicates with a melting temperature of 1080°–1050° C. are formed with FeO. It is the case of the fayalite-hercynite-silica eutectic (point M of the triangular diagram $FeO-SiO_2-Al_2O_3$ of FIGURE 1).

Considering the graph of FIGURE 2, which shows the liquid zones in a system of coordinates presenting the iron oxidation state in abscissa and the temperature in ordinate, it is observed that, for a low silica ore, curve A corresponds to a treatment without any melting, while there will be melting and adhesion if curve B is followed during the reduction. In the case of a high silica ore, the diagram of the liquid zones is modified according to the dotted line X and a rise of temperature carried out as previously described, according to curve A, causes melting and adhesion. To avoid these latter phenomena, one would substantially reduce the temperature rising speed and follow curve C. In practice, the reaction speeds would then be so much reduced that the reduction in a rotary furnace would no longer be possible with an economical yield from the furnace.

I have developed a process in which it is possible, in the case of a siliceous ore, to follow such a curve as curve A without provoking any adhesion.

The ores industrially treated contain more or less iron and more or less silica. That is why the industrial conditions are different in each case and the invention process is carried out according to a compromise between the theoretical solution and the least costly solution. Thus, with very low silica—thereby not very fusible—ores, it is possible to operate according to curve A with no melting and without taking all the precautions which would be indispensable to avoid adhesion if operating with a very high silica ore according to the same curve.

This invention produces dead soft iron grains in a rotary furnace from any iron ore while carrying out the reduction at a temperature above the melting temperature of the products under treatment without provoking any adhesion.

With such a process, it is possible in particular to work under satisfactory industrial conditions, as regards reduction speed and iron yield, for the treatment of ores including those which contain a high proportion of silica, without being inconvenienced by the formation of pasty products and their agglomeration or adhesion to the furnace walls.

The process of my invention comprises simultaneously all the following characteristics:

The process is carried out in a rotary furnace wherein the ore is introduced with the solid carbon reducing agent at one end and a heating agent at the other end. The proportion of solid carbon reducing agent to the ore is at most equal to, and preferably slightly lower than, the amount stoichiometrically necessary to obtain the total reduction of the iron oxides present in the ore. An excess of reducing agent is in opposition to the process.

The product under treatment, a mixture of ore and reducing agent, moves forward in the furnace and passes first through a heating zone in which it is partly calcined by the action of the burnt gases from that furnace zone wherein the reduction takes place. This heating zone may be as long as desired in order to assure the recovery of the heat contained in the gases from the reduction zone and commencement of reduction of the ore below 900° C. The gases progress in the furnace counter-flow to the mixture under an aspirating action generated for instance, by a ventilator placed at the ore entrance, and thereby heat the mixture to a temperature of substantially 900° C. Precautions are taken to ensure a good tightness at both ends of the rotary furnace. Coming out of the heating zone, the mixture passes into the reduction zone where a high concentration of carbon monoxide is maintained in contact with the mixture. Thus, contacting the mixture with the combustion gases is avoided by surrounding the mixture with carbon monoxide.

The mixture under treatment, surrounded by an atmosphere highly concentrated in carbon monoxide from the oxidation of the carbon contained therein, forms a layer which moves forward counter-flow to the combustion gases.

When leaving the reduction zone, the products are cooled in a reducing atmosphere down to 400° C.

When introducing the combustive gas, precautions are taken in order that the gases from the fuel combustion may not mix with the CO surrounding the solid layer. The total amount of combustive gas, for example air, is limited so that the furnace atmosphere may be continually reducing. The combustive gas is distributed to different points of the furnace by means of nozzles so that these combustive gas admissions produce no local overheating, create no oxidizing zone when in contact with the solid products, cause no whirl likely to affect the regular flow of the heating gases above the mixture. A preferred arrangement consists in utilizing nozzles opening near the furnace axis, so that the combustive gas may flow out parallel to said axis at a speed comparable to that of the heating gases. The temperature of the different zones of the furnace are adjusted by regulating the combustive gas admission at each of these nozzles.

Before they are introduced, the ore and the reducing agent are crushed and mixed, then agglomerated to suppress their segregation under the action of the rotary furnace and to lessen the losses due to dust entrainment. The solid carbon reducing agent is an ordinary material more or less easily convertible into coke, such as coke, anthracite, lignite, coal, etc.

The reduction may be carried out at a higher temperature than the melting temperature of the present silicates and at temperatures up to 1300° C. The average residence period in the reduction zone is generally between 1 and 3 hours.

The crushed fineness of the initial ore and reducing agent, the proportion of cokable reducing agent and the rate of the temperature rise in the furnace are regulated according to the ore to be treated and relatively to one another. The rate of temperature rise is most important: first, at the beginning of heating the agglomerates must not burst under the action of the steam or the gas escaping therefrom; secondly, the iron oxide from the agglomerates must be progressively reduced before they enter the part of the reduction zone where the temperature reaches or exceeds the melting temperature of the eutectics present therein, so that an infusible (at the temperature prevailing) soft iron framework, important enough to prevent the grains of melted eutectic from gathering, may be already present inside the agglomerates.

Under these conditions, the reducing action is continued on each fine droplet of ore when the agglomerates are located in the high temperature or reduction zone. At the high temperature in the reduction zone, the reduction speed is high and the amount of FeO which may be contained in the siliceous eutectics decreases rapidly, and simultaneously the ferrous framework becomes stronger. Therefore, due to the operating conditions, there is no adhesion when the melting temperature of the eutectics is reached and overpassed and the adhesion becomes less and less possible as the reduction progresses.

To regulate this initial progression of the reduction, one acts both on the yield from solid materials introduced and on the temperature at each point preceding the critical temperature zone, as indicated. Thus, although the temperatures at which some of the products in presence are in a pasty state are not avoided, the operation is carried out in such a way that the individual pasty particles cannot gather into grains large enough to prevent the oxide particle reduction and/or to adhere to the furnace walls.

It is not possible for each variable to be considered (crushed fineness, percentage of cokable reducing agent, speed of temperature rise) to give a precise value suitable for all the ores. Besides, these variables must always be considered relative to one another.

However, the more silica or products of low melting or softening point the ore contains, the richer the reducing agent must be in cokable elements and the better the temperature progression in the furnace must be controlled.

For the same ore, various combinations of values are possible, for example, a great fineness, such as 200 gauge mesh grains, a carbon reducing agent containing few cokable elements, and a relatively rapid temperature rise in the part of the reduction zone where it passes from about 900° to 1050° C.

It is also possible to choose a combination of values comprising a very great fineness, such as 325 ASTM gauge mesh particles, a reducing agent containing practically no cokable elements and a relatively rapid temperature rise in the part of the reduction zone where it passes from about 900° to 1050° C.

It is also possible with the same ore to choose a less fine granulometry, for instance 120 gauge mesh particles, a reducing agent rich in cokable elements and a slower temperature rise in the abovementioned zone.

Although various values of the cited variables are utilized to carry out the invention process, adhesion cannot be avoided during the reduction of ores having a moderate content of silica if the products to be agglomerated are crushed bigger than 80 ASTM gauge mesh, or if the product temperature rises at a speed above 100° C. per minute. In some cases, the carbon reducing agent must comprise cokable elements containing up to 40% volatile matters.

The following examples describe the various ways of practicing the invention process:

Example 1

The utilized ore (already described) contained:

| | Percent |
|---|---|
| Total iron (as oxidized compounds) | 47 |
| $SiO_2$ | 25.1 |
| $Al_2O_3$ | 6 |
| CaO | 2.5 |
| Fire loss | 0.4 |

The reducing agent utilized was coal containing 36% volatile matters, and saw dust. Ore and coal were crushed through a 120 ASTM gauge mesh; the saw dust was in the form of particles smaller than 1 mm. 16% coal and 9% saw dust were mixed with the ore. This mixture was agglomerated into pellets of about 2 cm. in diameter. These pellets progressed in the furnace so that between 900° and 1050° C. their temperature might rise at a speed of 50° C. per minute, then they were maintained at 1150° C.

After reduction, the pellets were cooled down away from air and crushed through a 200 gauge mesh. Then a magnetic separation was performed with a slight air blowing on the portion retained by the magnet. Thus, two parts were obtained having the following analysis:

| | Magnetic part, percent | Non-magnetic part, percent |
|---|---|---|
| Iron | 82.8 | Traces |
| FeO | 4.5 | 8.5 |
| C | 0.15 | 2.4 |
| $SiO_2$ | 9 | 68 |
| $Al_2O_3$ | 2.2 | 13.8 |
| CaO | | 5 |

Both parts had the same volume, but the weight of the magnetic part was twice that of the non-magnetic part.

In the magnetic part, 94.9% of the total iron contained in the ore was collected as iron and iron oxide. About 80% of the silica of the ore was in the non-magnetic part.

Example 2

The same ore as in Example 1 and coke were utilized. The products were crushed through a 120 gauge mesh and agglomerated into pellets. The temperature was raised from 900° to 1080° C. in 10 minutes. The reduction ended by maintaining the products at 1150° C.; there was no adhesion between the obtained pellets.

Example 3

The same ore as in Example 1 and coke were utilized. The products were crushed through a 325 gauge mesh and agglomerated into pellets. The temperature raised from 900° to 1080° C. in 5 minutes. The reduction ended by maintaining the products at 1150° C. There was no adhesion and the reduction yield was 91%.

*Example 4*

The same ore as in Example 1 was utilized with, as reducing agent, a mixture in equal proportions of coke and cokable coal containing 32% of volatile matters. The products were crushed through a 120 gauge mesh. Their temperature was raised from 900° to 1080° C. in 4 minutes and the reduction ended by maintaining the products at 1150° C. No adhesion was observed and the reduction yield was 93%.

*Example 5*

The composition of the utilized ore was:

| | Percent |
|---|---|
| Total iron (as oxidized compounds) | 43.5 |
| $SiO_2$ | 15.6 |
| $Al_2O_3$ | 2.7 |
| CaO | 4.5 |
| MnO | 0.8 |
| Fire loss | 13.3 |

The reducing agent was coke.

The products were crushed through a 120 gauge mesh. Their temperature was raised from 900° to 1080° C. in 5 minutes and the treatment continued at 1150° C. for 1 hour and 45 minutes. There was no adhesion and the reduction yield was 98%.

I claim:

1. A process for the production of low carbon iron from a siliceous iron ore comprising,
   (A) mixing the ore with a solid carbon reducing agent and agglomerating the mixture into pellets,
   (B) feeding the agglomerated pellets to one end of a furnace and flowing the pellets through a heating zone in the furnace countercurrently to a flow of combustion gases,
   (C) heating the agglomerated pellets in said heating zone to a temperature of approximately 900° C. at a rate of less than 100° C. per minute,
   (D) passing the heated pellets into a reduction zone and heating the pellets at a rate less than 100° C. per minute to the eutectic melting point of the pellets and forming a ferrous framework within the pellets which is infusible at the temperature prevailing,
   (E) continuing the heating of the pellets in the reduction zone to a temperature above the eutectic melting point of the pellets to strengthen the ferrous frameworks within the pellets and substantially complete reduction of the iron ore in the pellets, and
   (F) cooling the mixture of reduced iron ore and siliceous material in a reducing atmosphere.

2. A process as described in claim 1 in which the iron ore and solid carbon reducing agent are in particle size prior to agglomeration not larger than 80 ASTM gauge mesh.

3. A process as described in claim 1 in which the proportion of solid carbon reducing agent to the ore is at most equal to the amount stoichiometrically necessary to obtain the total reduction of the iron oxides present in the ore.

4. A process as described in claim 1 in which the final reduction of the iron ore is carried out at a temperature in the order of 1150° C.

5. A process as described in claim 1 in which the final reduction of the iron ore is carried out at a temperature not exceeding 1300° C.

6. A process as described in claim 1 in which the final reduction of the iron ore is carried out over a period of time varying from one to three hours.

7. A process as described in claim 1 in which during the reduction of the iron ore a reducing atmosphere is maintained around the pellets.

8. The process in claim 1 in which fuel is burned in said reduction zone in amounts such that a reducing atmosphere is maintained in contact with the pellets and in which the pellets are heated in the heating zone by combustion gases flowing from the reduction zone countercurrently to the flow of pellets into said zone.

References Cited by the Examiner

UNITED STATES PATENTS

| 3,196,000 | 7/1965 | Meyer et al. | 75—5 |
| 3,197,303 | 7/1965 | Collin | 75—33 |
| 3,215,521 | 11/1965 | Meyer et al. | 75—5 |
| 3,238,039 | 3/1966 | Sasabe | 75—33 X |

FOREIGN PATENTS 516,318   9/1955   Canada.

DAVID L. RECK, *Primary Examiner.*

H. W. TARRING, *Assistant Examiner.*